Figure 1:
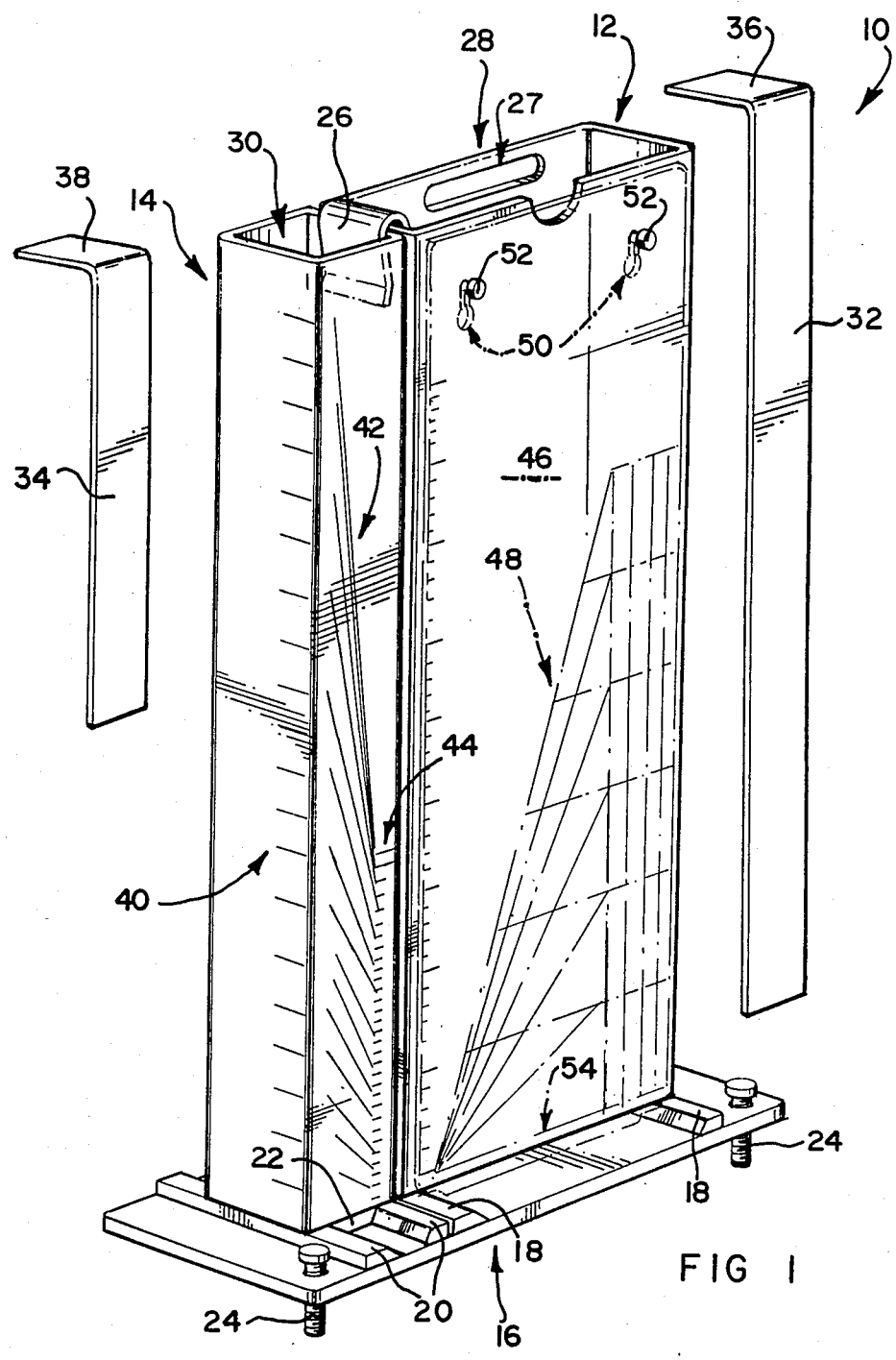

United States Patent [19]

Makkink

[11] Patent Number: 4,663,960
[45] Date of Patent: May 12, 1987

[54] METHOD OF CALIBRATING AND CALIBRATING DEVICE FOR AGRICULTURAL CHEMICAL

[76] Inventor: Andrew E. Makkink, P.O. Box 14, Sannieshof, 2760, South Africa

[21] Appl. No.: 808,858

[22] Filed: Dec. 13, 1985

[30] Foreign Application Priority Data

Dec. 17, 1984 [ZA] South Africa .................. 84/9813

[51] Int. Cl.$^4$ ............................................. G01F 25/00
[52] U.S. Cl. ........................................................ 73/3
[58] Field of Search ................ 73/3, 1 R, 168, 432 V, 73/861, 223, 427

[56] References Cited

U.S. PATENT DOCUMENTS

| | | | |
|---|---|---|---|
| 2,810,606 | 10/1957 | Taylor | 73/432 V |
| 3,129,844 | 4/1964 | Madison | 73/427 |
| 4,409,845 | 10/1983 | Stuttlebam et al. | 73/168 |

FOREIGN PATENT DOCUMENTS 2311283 12/1976 France ..................... 73/432 V
940553 10/1963 United Kingdom .................. 73/1 R Primary Examiner—Jerry W. Myracle
Assistant Examiner—Robert R. Raevis
Attorney, Agent, or Firm—Ladas & Parry

[57] ABSTRACT

In calibrating agricultural apparatus for administering agricultural chemical to an agricultural land at a required land concentration, the agricultural apparatus is operated under a predetermined condition to dispense a specimen amount of chemical, which is contained in a container of predetermined cross section. A nomogram, relating specimen amounts of chemical to land concentrations taking into account said predetermined condition, is located on the container such that a zero mark of the nomogram corresponds to a bottom of the container. The level of the specimen amount in the container is observed in relation to the nomogram and is related to a corresponding land concentration. Said land concentration is compared to the required land concentration and the agricultural apparatus is adjusted accordingly.

11 Claims, 5 Drawing Figures

METHOD OF CALIBRATING AND CALIBRATING DEVICE FOR AGRICULTURAL CHEMICAL

This invention relates to a method of calibrating and to a calibrating device. It relates more particularly to calibrating agricultural apparatus for administering agricultural chemical to an agricultural land.

In administering chemicals such as herbicide, insecticide, fertilizer, and the like, to an agricultural land, a specific concentration is required. The required concentration is usually expressed in terms of mass or volume per unit area, eg kilogram or liter per hectare. For brevity, this kind of concentration will in this specification be referred to as a 'land concentration'.

The chemical usually contains an active ingredient in a predetermined concentration. Thus, the required land concentration of active ingredient has to be converted to a volume of chemical applied per linear distance, taking the width of application into account. The apparatus has to be calibrated to administer said volume of chemical per linear distance.

Calibrating chemical administering apparatus for administering said volume per linear distance, in prior art apparatus, generally entails repeatedly operating the apparatus on the land, measuring the amount of chemical administered over said linear distance, and adjusting the apparatus suitably until the required volume is administered.

The above procedure is inconvenient and time-consuming (due to having to operate the apparatus on the land) and is prone to gross error (due to the real possibility of miscalculation, especially if calculations are done in situ).

To assist farmers in this regard, suppliers of agricultural chemicals employ technicians to calibrate administering apparatus for farmers or to assist farmers to do so. However, this service is expensive and it is not always possible to provide the service comprehensively. Thus all calibrating cannot be done by such technicians. For example, it is generally not possible for such technicians to do periodic checks to ensure that apparatuses are still correctly calibrated. This provides a problem in that, generally, calibration of administering apparatuses drift and they have to be readjusted periodically.

Furthermore, it is to be realized that, generally, first, time is of the essence when agricultural chemicals are to be administered; and, second, a large proportion of farmers in an area need to administer the chemicals at roughly the same time (e.g. planting immediately after good rains have fallen at the beginning of a season). Thus, during peak times, technicians are in high demand and cannot attend to all of the work in good time. On the other hand, farmers cannot wait until a technician is available to commence administering the chemical.

The problems are aggravated in that the same apparatus is used to administer different chemicals (such as for different purposes in relation to the same crop, and for different crops) and at different concentrations (such as when conditions, e.g. soil characteristics, vary) thus requiring the apparatuses to be calibrated repeatedly during a season.

Modern farming methods dictate that, at times, more than one chemical, or concentration, be administered simultaneously in one working operation. Bearing the above problems in mind, it is hardly possible accurately to administer such multiple chemicals simultaneously.

Farmers are mostly forced to attempt to do their own calibrating, a task few are capable of doing successfully with current calibrating techniques.

It is an object of this invention to alleviate the above problems. More particularly, the invention provides a calibrating method and a calibrating device which are relatively easy to use, and which, it is believed, will make it possible for farmers successfully to calibrate their own equipment and to become independent from technicians they have no control over.

In accordance with a first aspect of the invention, in calibrating agricultural apparatus to administer agricultural chemical in a required land concentration to an agricultural land, there is provided the method of providing, on a substrate, a nomogram relating specimen amounts of chemical, dispensed under a predetermined condition, to corresponding land concentrations;

locating the substrate in relation to a container having a predetermined cross-sectional area, such that a zero position on the nomogram in respect of said specimen amounts of chemical corresponds to a bottom of the container;

dispensing a specimen amount of the chemical, or a substance closely resembling the chemical, under said predetermined condition by means of said agricultural apparatus;

containing the specimen amount of chemical or substance thus dispensed in the container;

observing the level of chemical or substance in the container in relation to the nomogram, and relating it to a corresponding land concentration;

comparing said corresponding land concentration to the required land concentration; and adjusting the agricultural apparatus appropriately.

Said predetermined condition may be a relatively short, predetermined time period, the nomogram having as a parameter land speed. The time period may be of the order of a minute.

Instead, said predetermined condition may be a relatively short, predetermined distance. When dispensing of chemical by the apparatus is actuated by means of a land wheel, said land wheel may be elevated and rotated a number of revolutions corresponding to said predetermined distance. The distance may be of the order of 100 to 200 meters.

The nomogram may have as a parameter, one of swath width, lateral spacing of passes over the load and nozzle spacing in the case of full surface application.

When the agricultural chemical is in the form of a clear aqueous solution, the method may include using water as a calibrating medium, at least initially.

In accordance with a second aspect of the invention, in calibrating agricultural apparatus to administer agricultural chemical in a required land concentration to an agricultural land, there is provided the method of providing, on a substrate, a nomogram relating land concentrations to corresponding specimen amounts of chemical, dispensed under a predetermined condition;

relating the required land concentration by means of the nomogram to a corresponding required specimen amount;

locating the substrate in relation to a container having a predetermined cross-sectional area, such that a zero position on the nomogram in respect of said specimen amounts corresponds to a bottom of the container;

dispensing a specimen amount of the chemical, or a substance closely resembling the chemical, under said predetermined condition by means of the agricultural apparatus;

containing said specimen amount of the chemical or substance closely resembling the chemical in the container and observing the level thereof in relation to the nomogram;

comparing said specimen amount to the required specimen amount; and adjusting the agricultural apparatus accordingly.

The invention extends to calibration apparatus for calibrating agricultural apparatus to administer agricultural chemical in a required land concentration to an agricultural land, the calibration apparatus comprising a container adapted to contain a specimen amount of agricultural chemical and having a bottom, a predetermined cross-sectional area, and including locating means;

a substrate incorporating a nomogram relating specimen amounts of chemical dispensed under a predetermined condition to corresponding land concentrations, the substrate having locating means complemental to the locating means of the container, releasably to locate the substrate in relation to the container such that a zero position on the nomogram in respect of said specimen amounts of chemical corresponds to the bottom of the container, corresponding portions of the container and the substrate being transparent to allow observation of the level of a specimen amount of chemical in the container.

A number of substrates with different nomograms catering for different sets of circumstances can be provided for use with said container.

The calibration apparatus may include levelling means to level the container when it is supported on a support surface.

The calibration apparatus may include a base for supporting the container, and mounting means on the base for releasably mounting the container.

The calibration apparatus may include a ruler having a fixed orientating formation, the apparatus including a complemental orientating formation arranged to orientate the ruler orthogonally with the nomogram, in use.

Said container may be a first container, the apparatus incuding a second container having a bottom and a predetermined cross-sectional area different to that of the first container, and proportioning means to releate a level in the second container to an equivalent level in the first container. The cross sectional area of the second container may be substantially less than that of the first container. Thus, when a monitor amount is small, it can be contained in the second container, and the level of the amount in the second container related to a corresponding level in the first container by means of the proportioning means to enable it to be used with the nomogram.

The invention is now described by way of example with reference to the accompanying diagrammatic drawings. In the drawings FIG. 1 shows, in three dimensional view, calibrating apparatus in accordance with the invention; and FIGS. 2 to 5 show different nomograms suitable to form part of the calibrating apparatus of FIG. 1.

With reference to FIG. 1, calibrating apparatus in accordance with the invention is generally indicated by reference numeral 10. The apparatus 10 comprises a first container and a second container respectively indicated at 12 and 14. The containers 12 and 14 are of orthogonal shapes and of substantially equal heights and depths. The container 12 is roughly three times as wide as the container 14. The container 12 is of about 6 liter capacity and the container 14 of about 2 liter capacity.

The containers 12, 14 are supported adjacent one another on a base 16. Each of the containers 12, 14 has a pair of decumbent parallel slides 18, 20 at its bottom. The slides of each pair having opposing, parallel, oblique faces. The base 16 has a pair of retaining formations respectively complemental to the pairs of slides. Only one of said retaining formations is shown at 22. The retaining formation 22 is complemental to the slides 20 of the container 14. The retaining formations each has parallel opposed sides which are complementally oblique with respect to the sides of the slides 18, 20 to retain the slides 18, 20 and thus their containers 12, 14 slidably, dovetail fashion on the base 16. Spring loaded ball and detent mechanisms (not shown) are provided in the base 16 and the containers 12, 14 to locate the containers 12, 14 in the sliding direction.

The base 16 has three adjusting screws of which two only are shown at 24. The screws 24 screw through the base 16 to adjust its level with respect to a support surface on which the apparatus 10 can be stood in use.

A clip 26 is provided to clip the containers 12, 14 together at their upper ends 28, 30 which are open to allow filling. Said upper ends 28, 30 are defined by upper ends of walls of the containers 12, 14 and which are orthogonal with respect to the rest of the containers.

A slot 27 is provided in a rear wall of the container 12 to allow it to be gripped by hand to facilitate handling.

The apparatus 10 further comprises a pair of rulers 32, 34 having right angled end portions indicated at 36, 38. The ruler 32 is relatively long of a length corresponding to the height of the containers 12, 14. The length of the ruler 34 corresponds to the width of the container 12. The rulers 32, 34 are provided to draw lines on nomograms as is described hereinafter. The angled end portions 36, 38 are adapted respectively to rest on the open ends 28, 30 and to rest against a side of the container 12 to position the lengths of the rulers 32, 34 orthogonally with respect to the nomograms. The end portions 36, 38, the orthogonal upper ends 28, 30 and the side of the container 12 provide orientating formations in accordance with the invention.

The container 14 has, along one side thereof, calibration marks 40 indicating different levels and corresponding volumes. On a front of the container 14, there are providing proportioning marks 42 providing proportioning means in accordance with the invention. The proportioning marks 42 extend respectively from calibration marks 40 toward calibration marks 44 on the front of the container 14. The calibration marks 44 indicate levels corresponding to volumes of the large container 12 equivalent to the volumes of the smaller container 14. The proportioning marks 42 thus relate volumes of the smaller container 14 to equivalent volumes of the larger container 12. This aspect is described in more detail hereinafter.

The containers 12, 14 are transparent. In this embodiment they are in the form of moldings of synthetic plastics material. It is to be appreciated that the material will be compatible to the chemicals for which it is intended.

Shown, in shadow lines, attached to the container 12, is a substrate 46 having markings 48 in the form of a nomogram.

The substrate 46 has, toward an upper end thereof, a pair of apertures 50, inverted keyhole fashion, corresponding to a pair of headed pins 52 fixed to the container 12. The apertures 50 and pins 52 co-operate releasably to locate the substrate on the container 12 and provide locating means in accordance with the invention. The apertures 50 and pins 52 are arranged such that a zero mark, indicated at 54, of the nomogram 48 corresponds to a bottom of the container 12.

The calibrating apparatus 10 is intended to facilitate calibrating agricultural apparatus for administering agricultural chemical in a required land concentration to an agricultural land. The agricultural apparatus is operated under a predetermined condition, e.g. for a predetermined, relatively short time, or over a predetermined relatively short distance. The agricultural chemical dispensed as a result of such operating, herein referred to as a specimen amount, is contained in one of the containers 12, 14. If the specimen amount is about 2 liter or less, it is conveniently contained in the container 14. If it is more than 2 liter and less than 6 liter, it is contained in the container 12. The apparatus is levelled by means of the levelling screws 24. If the chemical applied is not a liquid, the chemical must be levelled within the container prior to taking readings. The nomogram 48 relates the specimen amount to a land concentration. The land concentration is compared to the required land concentration and the agricultural apparatus is adjusted accordingly. This is repeated until the agricultural apparatus is calibrated correctly. This is broadly the procedure recommended to test the calibration of an agricultural apparatus.

If desired, a level indicator can be provided to enhance accuracy of levelling. However, it is to be appreciated that readings are taken generally at or near a vertical center line of the container 12, thus making leveling less critical.

For a new calibration, the required land concentration is related to a required specimen amount. An actual specimen amount is obtained, is contained in one of the containers 12, 14 and is observed in relation to the nomogram reflecting the required specimen amount. The actual and required specimen amounts are compared and the apparatus adjusted accordingly.

However, if desired, the first mentioned procedure can be used for new calibrations and the second to test the calibration of an agricultural apparatus. Instead, any one of the procedures can be used for both said functions.

The nomogram 48 is compiled for use with the container 12 which has a predetermined cross section. Thus, if the specimen amount is contained in the container 14, its level is related by means of the proportioning markings 42 to a level 44 corresponding to an equivalent level of the container 12. Then, the abovementioned procedures can be followed. The Applicant is of opinion that the percentage error in observing the level of chemical in a container is relatively high relative to the percentage error in reading the nomogram. Thus, it is believed that small amounts can be dealt with more accurately if they are contained in the smaller container 14 (thus favouring accuracy in reading the level) and the level transferred to an equivalent level of the container 12.

It is to be appreciated that a substance closely resembling the agricultural chemical can be used at least for the initial steps in the calibrating procedure. Thus, for example, if the agricultural chemical is a clear aqueous solution, water can be used as a calibrating medium initially.

Different nomograms are used for different applications. A few nomograms are now described by way of example.

Figure 2:
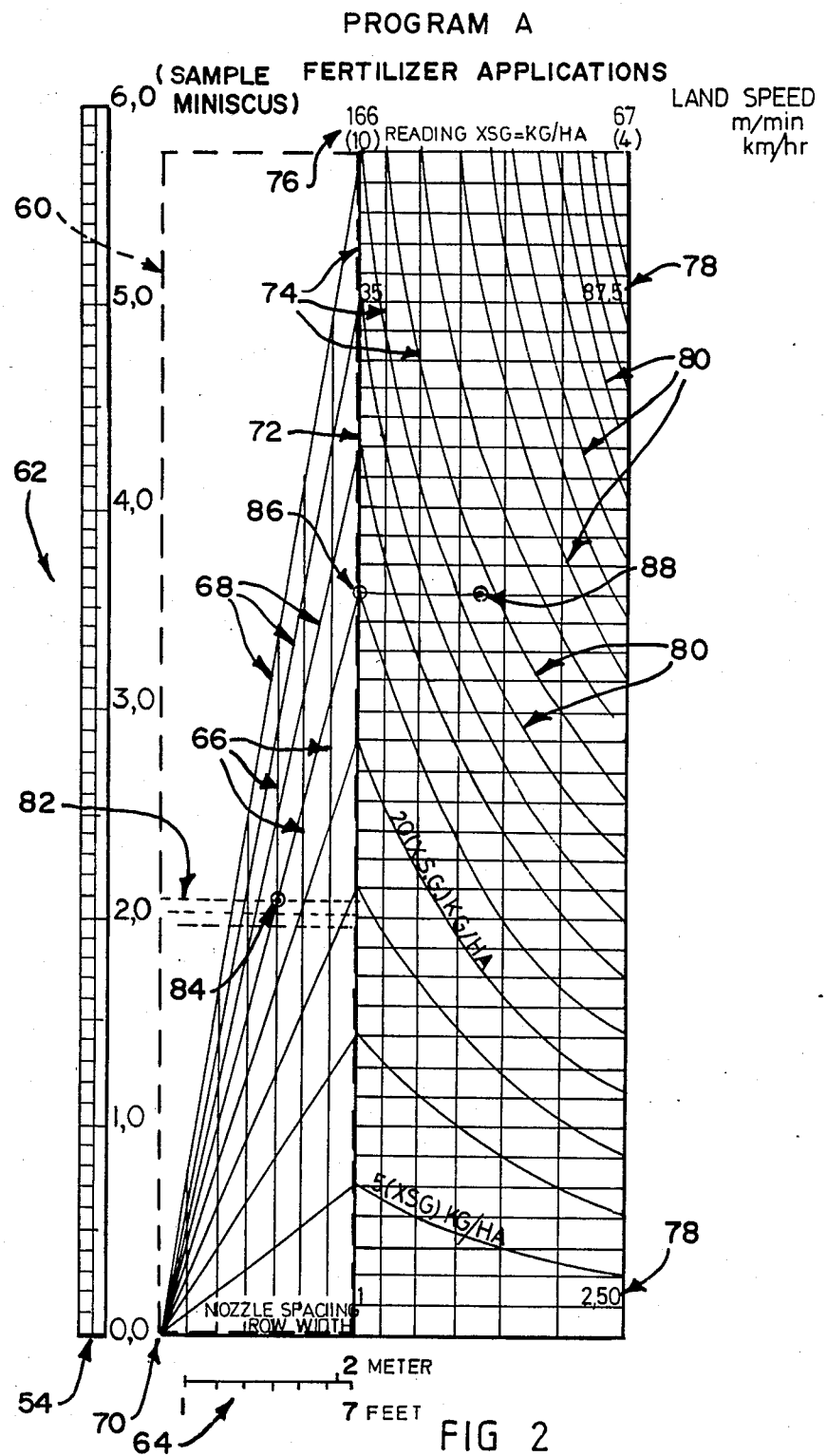

A first nomogram entitled program A is illustrated in FIG. 2. The nomogram of FIG. 2 caters for application of agricultural chemical in lines or lanes at a constant lateral spacing.

A substrate on which the nomogram is reflected is transparent in an area indicated at 60.

The nomogram comprises a level scale or volume scale indicated at 62 reading from 0 liter to 6 liter. The zero mark on the scale 62 is indicated at 54 and is in use arranged at the same level as the bottom of the container 12.

At the bottom of the nomogram, a horizontal scale is indicated at 64 in meters and feet and relating to a nozzle spacing or row width, i.e. the lateral spacing of lines or lanes along which chemical is administered. Horizontally spaced, vertical lines 66 extend upwardly from the scale 64 corresponding to the spacing in feet of the scale 64.

A zero point 70 corresponds to the zero level 54 and zero spacing on the scale 64. A boundary line 72 coincides with the vertical lines 66 corresponding to a spacing of 7 feet on the scale 64. Oblique lines 68 interconnect the zero point 70 and various predetermined points at different levels on the boundary line 72.

To the right of the boundary line 72, a number of horizontally spaced, vertical lines are indicated at 74 corresponding to different land speeds indicated at 76 on a horizontal scale in meter per minute and kilometer per hour. Landspeed is thus a parameter in the nomogram of FIG. 2.

Land concentrations are worked out for the intersections of the vertical land speed lines 74 and vertically spaced horizontal lines extending from the boundary line 72 from points of intersection of the oblique lines 68 and the boundary line 72. A few such land concentrations only are indicated in FIG. 2 by reference numerals 78. Curves 80 are superimposed on the land speed lines 74 and said horizontal lines commencing at the boundary line 72. The curves 80 interconnect points of constant land concentration. Thus, each line 80 represents a constant land concentration. Such constant land concentrations are marked on the curves 80. A few land concentrations only are marked in FIG. 2.

It is to be appreciated that, in FIG. 2, for the sake of clarity, only a few of the markings appearing on an actual nomogram in accordance with the invention, are shown.

In use, when the calibration of an agricultural implement is to be checked, a specimen amount is dispensed over a predetermined, relatively short period which, for use with the nomogram of FIG. 2, is one minute. In use, for example, the chemical is applied in lines or lanes of 4 feet lateral spacing, and at a land speed of 6.5 kilometer per hour.

The specimen amount, when contained in the container 12 is, for example, at a level indicated at 82. The intersection between the level 82 and the vertical line 66 corresponding to 4 feet spacing is indicated at 84. The zero point 70 and the point 84 are interconnected and elongated to a point where it intersects the boundary line 72, i.e. at 86. A horizontal line is drawn from the point 86 to the right. The point of intersection between such line and a vertical line parallel to the land speed lines 74 corresponding to the land speed 6.5 is indicated at 88. The point 88 represents a land concentration of about 43 kilogram per hectare, which value is compared to the required land concentration. The apparatus is then adjusted accordingly.

When the chemical has a specific gravity (or density) other than 1, the value obtained for land concentration must be multiplied by the specific gravity (or density) to obtain the actual land concentration in units of mass per area. (Further on this specification only the term "specific gravity" is used and must be interpreted to means "density" where appropriate).

When a new calibration is to be effected in accordance with the invention, the required land concentration, adjusted for specific gravity if applicable by dividing the actual required land concentration by the specific gravity, is plotted in line with the actual land speed, e.g. the point 88. A horizontal line is drawn to the left from the point 88 to the boundary line 72, i.e. the point 86. The point 86 is interconnected with the zero point 70. The intersection of such line interconnecting the points 86 and 70 with the applicable nozzle spacing or row width line 66 is marked i.e. point 84. The level of the point 84 represents the required specimen amount. The actual specimen amount is contained in the container 12 and compared to the level of the mark 84. The apparatus is then adjusted accordingly.

The nomogram of FIG. 2 is calculated for a concentration of 25%. When the chemical used has a concentration other than 25%, a further correction has to be effected. A further nomogram is illustrated in FIG. 3 to effect such corrections for concentration.

Figure 3:
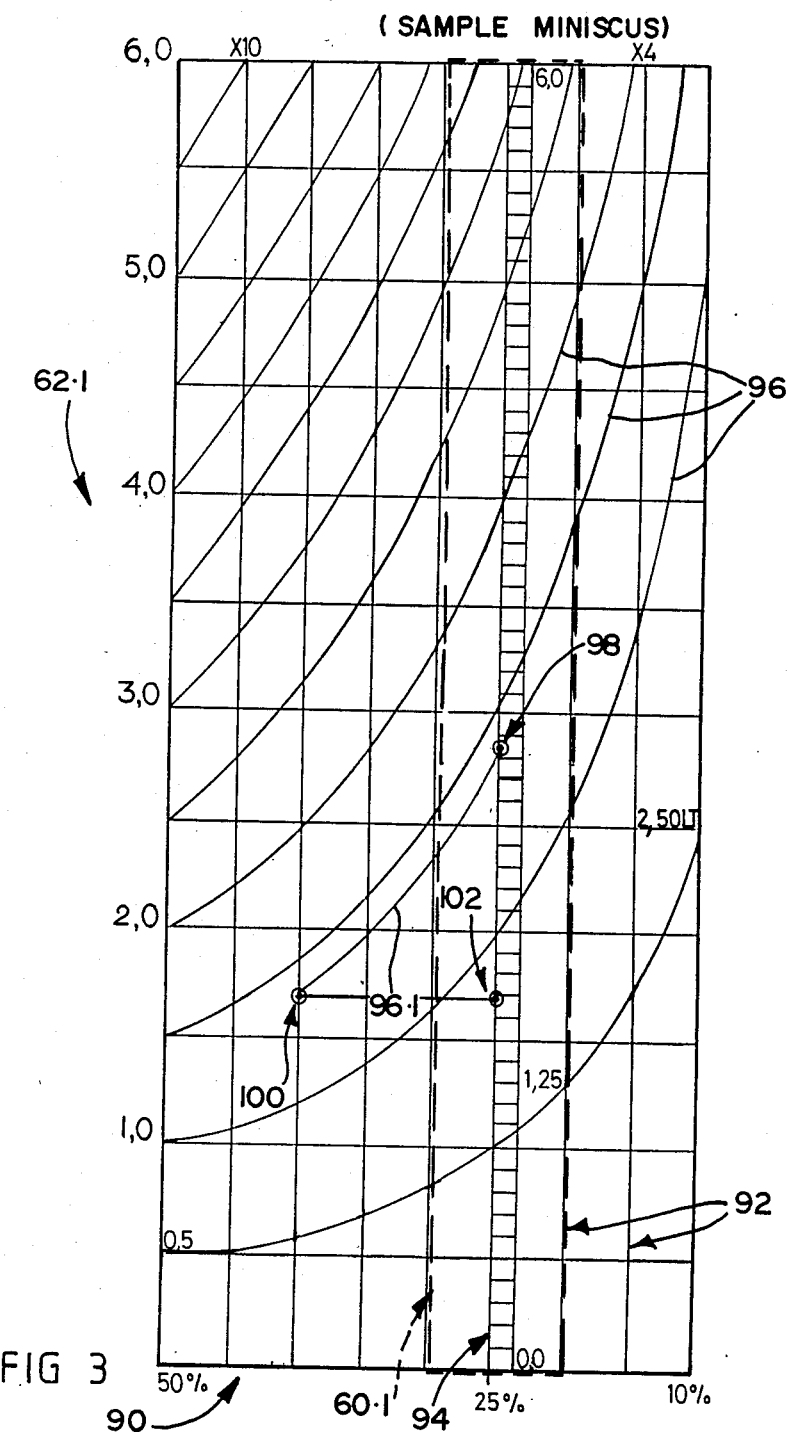

The nomogram of FIG. 3 is marked on a substrate having a transparent portion indicated at 60.1. At the left of the nomogram, there is a scale 62.1 corresponding to the scale 62 of FIG. 2. Vertically extending horizontally spaced lines are provided for different concentrations from 10% to 50% in steps of 5%. The vertical line corresponding to a concentration of 25% is subdivided in tenths of a liter as indicated at 94. Curves 96 are superimposed on the vertical lines representing concentration and the horizontal lines representing volume in liter. The curves 96 respectively represent equivalent volumes for different concentrations. For example, with reference to the lowest of the curves 96, a volume of 0.5 liter at a concentration of 50% is equivalent to a volume of 2.5 liter at a concentration of 10% which is again equivalent to a volume of 1 liter at a concentration of 25%.

Thus, for example, if a required specimen amount, at a concentration of 25%, is, say 2.7 liter, and the actual concentration of the chemical to be used is, say 40%, a correction for concentration is done as follows:

Plot the volume of 2.7 liter on the scale 94 i.e. the point 98 in FIG. 3. Draw a curve corresponding to the curves 96 from the point 98 to the vertical line corresponding to a concentration of 40%. The intersection is indicated at 100. Draw a horizontal line through the point 100 to the scale 94. The intersection is indicated at 102 and is at a volume of about 1.7 liter. Thus, the corrected required specimen amount is 1.7 liter and not 2.7 liter.

If the first procedure described with reference to FIG. 2 is followed, i.e. the procedure recommended for checking an existing calibration, the correction nomogram of FIG. 3 is used in reverse.

Figure 4:
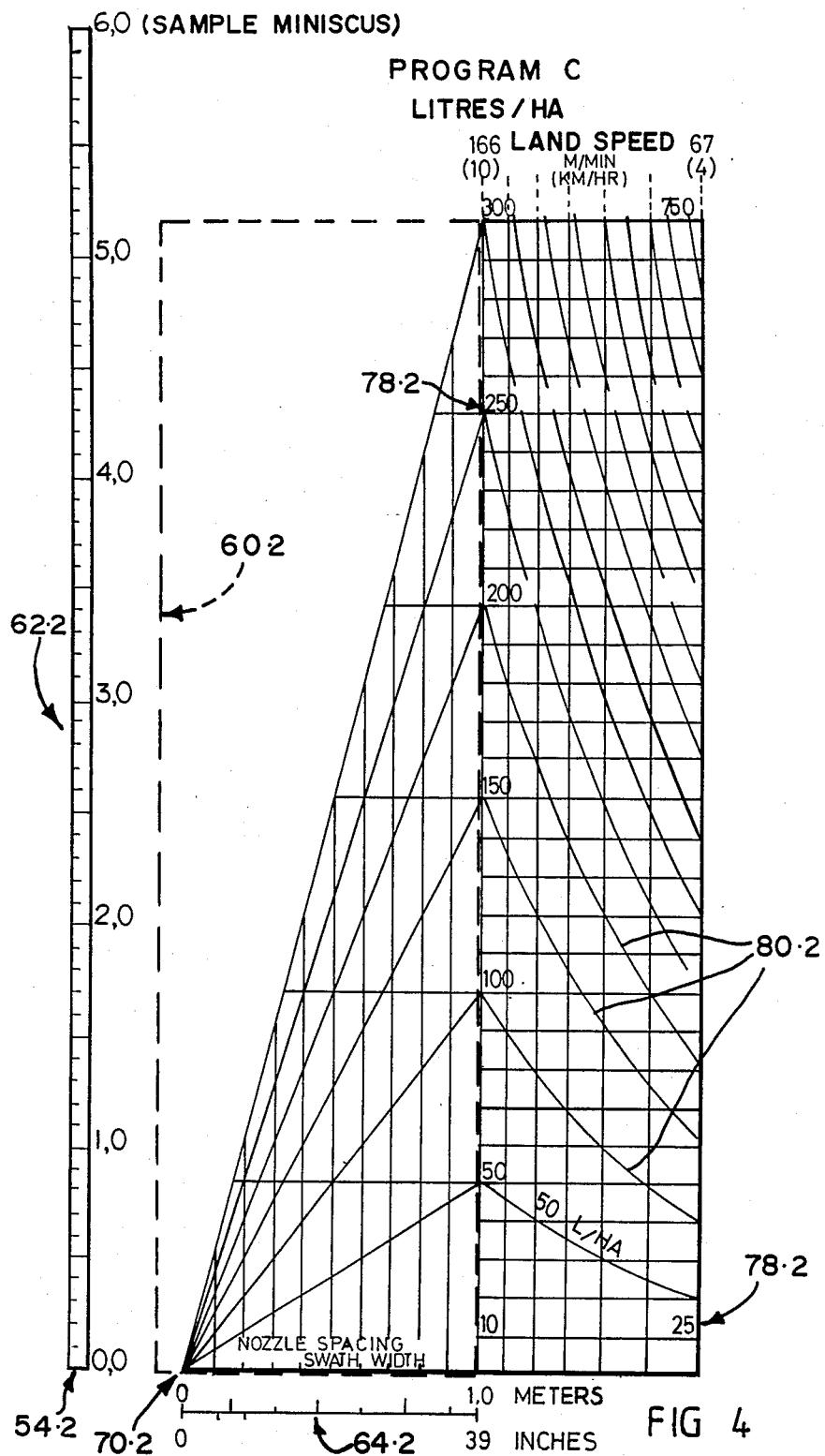

FIG. 4 illustrates a nomogram for use in applications where agricultural chemical is applied over a area and the land concentration is expressed in liters per hectare. The nomogram of FIG. 4 is similar to the nomogram of FIG. 2 and like features are numbered alike. The nomogram of FIG. 4 is used in similar fashion which is not described again.

Figure 5:
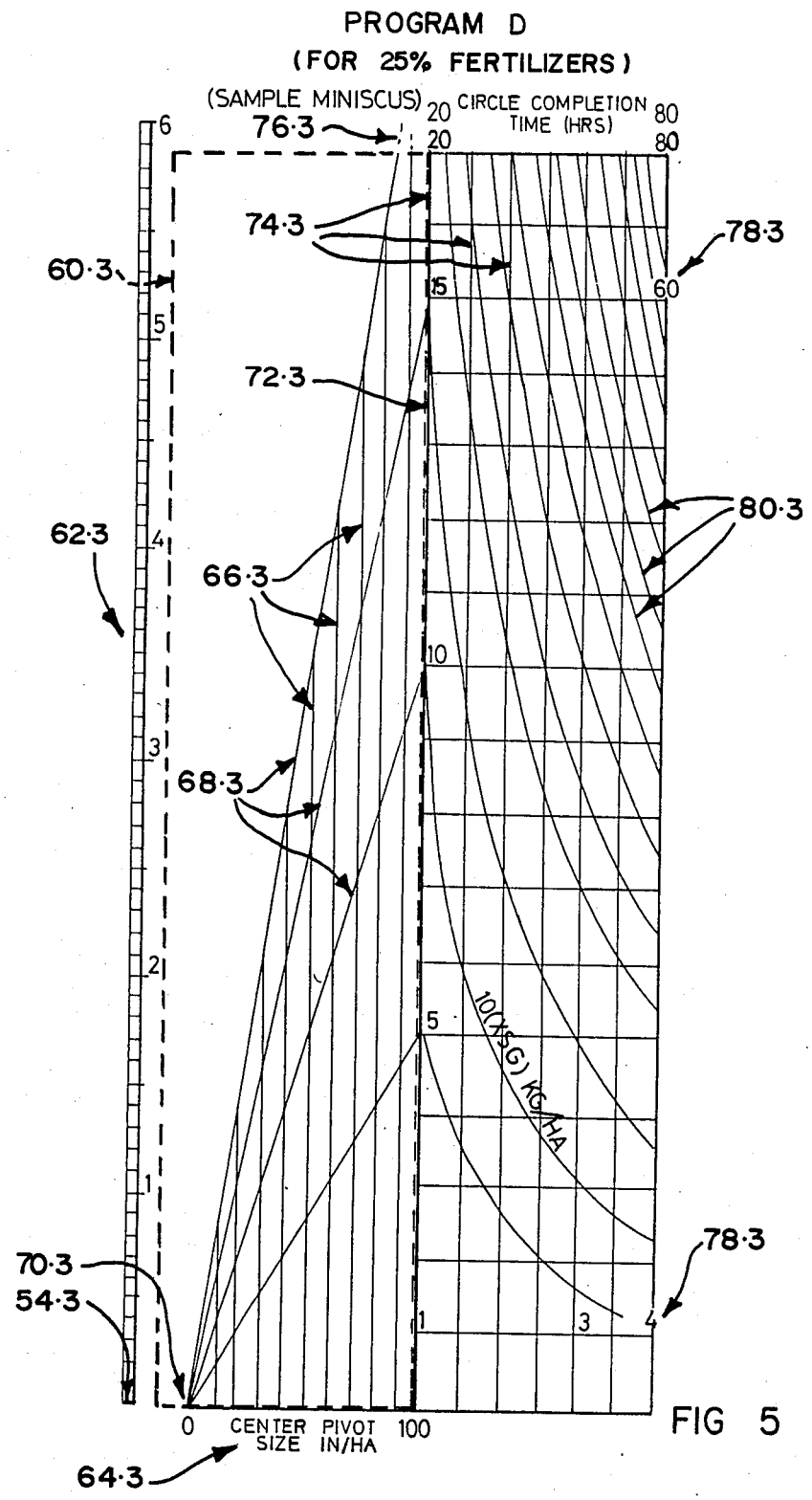

In FIG. 5 a nomogram is illustrated for use in calculating agricultural chemical administered by means of an irrigation system. If the chemical is a fertilizer, such administering is sometimes referred to as "fertigation". The specimen amount of chemical is collected prior to mixing with irrigation water.

The nomogram of FIG. 5 is similar to the nomogram of FIG. 2 and like reference numerals refer to like features. The nomogram of FIG. 5 and its use are thus not described again.

The scale 64.3 in FIG. 5 relates to the center pivot size in hectare in the case of a center pivot system or to the area covered in hectare per cycle in other systems. The scale 76.3 refers to the circle completion time in hours for a center pivot system or a cycle completion time in hours for other systems.

It is an advantage of the invention that calibration can be performed without necessarily operating the administering equipment on a land. It is a further advantage that no, or at most very little, calculations need be done to calibrate equipment.

Generally speaking, when the calibrating apparatus as illustrated and described is available, merely the correct nomogram or nomograms need be selected and two measurements have to be made, i.e. the amount of liquid dispensed in one minute and the land speed, e.g. in meters per minute. Thus, for example when the calibration of equipment is to be checked, it is best done while the equipment is in use. Physically, a mark is made at the instantaneous position of the equipment on a land. Simultaneously, the flow through a nozzle is directed into the container for 1 minute. The position of the equipment at the end of the time period of 1 minute is again marked. The amount dispensed during the one minute, and the distance travelled by the equipment during the one minute, are measured. Then the procedures outlined in the examples can be employed.

It is thus a first advantage of the invention that calibration of equipment is much simplified in comparison to other, known techniques which are complex. It is a second advantage that calibration can be effected more conveniently and in less time than with other known techniques. A user needs be taught one basic technique only, which is then applicable to calibration of apparatus for all agricultural chemicals, i.e. liquids and particulate materials; fertilizer, herbicides and insecticides. The technique is applicable for all methods of administering of chemicals, i.e. dispensing of particular chemicals, spraying of liquid chemicals and administering by means of irrigation apparatus.

I claim:

1. A method of calibrating an agricultural apparatus to administer an agricultural chemical in a required land concentration to an agricultural land, the method including providing, on each of a plurality of substrates, a nomogram relating specimen amounts of chemical, dispensed under one of a corresponding plurality of predetermined, different, conditions, to corresponding land concentrations for at least one predetermined parameter of which a plurality of values are indicated on a scale so as to allow interpolation between said indicated values;

selecting a nomogram of which the predetermined condition is suitable for a prevailing condition;

removably locating the substrate on which said selected nomogram is provided in relation to a container having a predetermined cross-sectional area, such that a zero position on the nomogram in respect of said specimen amounts of chemical corresponds to a bottom of the container;

dispensing a specimen amount of the chemical, or a substance closely resembling the chemical, under said predetermined condition and in accordance with a predetermined value for the or each of said at least one parameter by means of said agricultural apparatus;

containing the specimen amount of chemical or substance thus dispensed in the container;

observing the level of chemical or substance in the container in relation to the nomogram, and relating it by means of the nomogram to a corresponding land concentration in accordance with said predetermined value for the or each of said at least one parameter;

comparing said corresponding land concentration to the required land concentration; and adjusting the agricultural apparatus appropriately to administer the agricultural chemical in said required land concentration.

2. A method as claimed in claim 1 in which said predetermined condition is a relatively short, predetermined time period, and in which said at least one predeterminable parameter includes land speed.

3. A method as claimed in claim 1 in which said predetermined condition is a relatively short, predetermined linear distance.

4. A method as claimed in claim 1 in which said at least one predetermined parameter includes at least one selected from the group: width of application, lateral spacing of passes over the land and land speed.

5. A method of calibrating as claimed in claim 1, in which the agricultural chemical is in the form of a clear aqueous solution, the method including using water as a calibrating medium, at least initially.

6. A method of calibrating an agricultural apparatus to administer an agricultural chemical in a required land concentration to an agricultural land, the method including providing, on each of a plurality of substrates, a nomogram relating land concentrations to corresponding specimen amounts of chemical, dispensed under one of a corresponding plurality of predetermined, different, conditions, for at least one predeterminable parameter of which a plurality of values are indicated on a scale so as to allow interpolation between said indicated values;

selecting a nomogram of which the predetermined condition is suitable for a prevailing condition;

relating the required land concentration by means of said selected nomogram and in accordance with a predetermined value for the or each of said at least one parameter, to a corresponding required specimen amount;

removably locating the substrate on which said selected nomogram is provided in relation to a container having a predetermined cross-sectional area, such that a zero position on the nomogram in respect of said specimen amounts corresponds to a bottom of the container;

dispensing a specimen amount of chemical, or a substance closely resembling the chemical, under said predetermined condition and in accordance with said predetermined value for the or each of said at least one parameter by means of the agricultural apparatus;

containing said specimen amount of the chemical or substance closely resembling the chemical in the container and observing the level thereof in relation to the nomogram;

comparing said specimen amount to the required speciment amount; and adjusting the agricultural apparatus appropriately to administer the agricultural chemical in said required land concentration.

7. Calibration apparatus for calibrating an agricultural apparatus to administer an agricultural chemical in a required land concentration to an agricultural land, the calibration apparatus comprising a container adapted to contain a specimen amount of agricultural chemical and having a bottom, a predetermined cross-sectional area, and including first locating means;

a plurality of substrates each incorporating a nomogram relating specimen amounts of chemical dispensed under one of a corresponding plurality of predetermined, different, conditions, to corresponding land concentrations for at least one predeterminable parameter of which a plurality of values are indicated on a scale so as to allow interpolation between said indicated values, each substrate having second locating means complemental to the first locating means, releasably to locate each respective substrate in relation to the container such that a zero position on the nomogram incorporated in the respective substrate in respect of said specimen amounts of chemical corresponds to the bottom of the container, corresponding portions of the container and each substrate being transpaent to allow observation of the level of a specimen amount of chemical in the container.

8. Calibration apparatus as claimed in claim 7, which includes leveling means to level the container when it is supported on a support surface, the leveling means comprising adjustment means selectively to adjust an attitude of the container and visual indication means adapted to indicate whether or not the container is level.

9. Calibration apparatus as claimed in claim 7, which includes a base for supporting the container, and mounting means on the base for releasably mounting the container.

10. Calibration apparatus as claimed in claim 7, which includes a ruler having a fixed orientating formation, the apparatus including a complemental orientating formation arranged to orientate the ruler orthogonally with the nomogram, in use.

11. Calibration apparatus as claimed in claim 7, in which said container is a first container, the apparatus including a second container having a bottom and a predetermined cross-sectional area different to that of the first container, and proportioning means to relate a level in the second container to an equivalent level in the first container.

* * * * *